(12) United States Patent
Jia et al.

(10) Patent No.: US 9,339,880 B2
(45) Date of Patent: May 17, 2016

(54) FACE HOBBING CUTTER SYSTEM AND INDEXABLE MILLING INSERTS FOR USE IN THE SAME

(71) Applicant: SANDVIK INTELLECTUAL PROPERTY AB, Sandviken (SE)

(72) Inventors: Tong Jia, LangFang (CN); Yan Duan, Beijing (CN)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 241 days.

(21) Appl. No.: 13/766,905

(22) Filed: Feb. 14, 2013

(65) Prior Publication Data

US 2014/0056657 A1    Feb. 27, 2014

(30) Foreign Application Priority Data

Feb. 16, 2012    (CN) .......................... 2012 1 0035560

(51) Int. Cl.
*B23F 21/12*    (2006.01)
*B23F 21/22*    (2006.01)

(52) U.S. Cl.
CPC ........... *B23F 21/226* (2013.01); *Y10T 407/171* (2015.01); *Y10T 407/1705* (2015.01); *Y10T 407/1715* (2015.01); *Y10T 409/105247* (2015.01)

(58) Field of Classification Search
CPC ...... B23F 21/126; B23F 21/128; B23F 21/22; B23F 21/223; B23F 21/226; Y10T 407/1705; Y10T 407/171; Y10T 407/1715; Y10T 407/1725; Y10T 407/1735; Y10T 407/174; Y10T 407/1745; Y10T 409/101431; Y10T 409/10159; Y10T 409/101749; Y10T 409/101908; Y10T 409/104134; Y10T 409/105247; Y10T 409/105406; Y10T 409/106042; Y10T 409/106678; Y10T 409/106837; Y10T 409/106996; Y10T 409/107155; Y10T 409/107314
USPC .......... 407/23, 25, 27–29, 21, 22; 409/10–13, 409/27, 34–35, 43–47
See application file for complete search history.

(56) References Cited

U.S. PATENT DOCUMENTS 1,931,169 A * 10/1933 Slade .............................. 407/21
1,969,843 A *  8/1934 Head .............................. 409/26
2,766,664 A * 10/1956 Ciallie ........................... 409/26

(Continued)

FOREIGN PATENT DOCUMENTS

DE             20016673 U1    1/2001

*Primary Examiner* — Daniel Howell
*Assistant Examiner* — Nicole N Ramos
(74) *Attorney, Agent, or Firm* — Corinne R. Gorski (57) ABSTRACT

A face hobbing cutter system for face hobbing spiral bevel gears. The system includes at least one set of detachable cartridge assemblies having a plurality of respective cartridge assemblies. Each cartridge assembly includes a plurality of cartridges and indexable milling inserts. A part of the inserts of each set of cartridge assemblies are rhombic, tangential-mounted inserts for milling flanks of spiral bevel gear teeth, while the other inserts are grooving inserts, which are arranged transversely to the tangential-mounted inserts, for milling roots of spiral bevel gear teeth. The tangential-mounted inserts of each set of cartridge assemblies are provided in pairs, one being provided with its front facing the central axis, and the other being provided with its front facing away the central axis, to respectively mill concave curved flanks and convex curved flanks of the spiral bevel gear teeth.

9 Claims, 7 Drawing Sheets

(56) References Cited

U.S. PATENT DOCUMENTS

| | | | |
|---|---|---|---|
| 2,930,112 A * | 3/1960 | Thomas | 407/22 |
| 4,904,129 A * | 2/1990 | Sugimoto et al. | 407/21 |
| 5,290,135 A * | 3/1994 | Ball et al. | 407/11 |
| 6,086,291 A | 7/2000 | Hansson | |
| 6,609,858 B1 | 8/2003 | Francis | |
| 6,632,050 B2 | 10/2003 | Erickson | |
| 6,715,968 B1 | 4/2004 | Tagtstrom | |
| 7,736,099 B2 | 6/2010 | Cole | |
| 8,113,750 B2 * | 2/2012 | Hsiao et al. | 409/26 |
| 2007/0140798 A1 * | 6/2007 | Cole et al. | 407/21 |
| 2010/0111629 A1 * | 5/2010 | Durr | B23F 9/10 409/27 |
| 2010/0196107 A1 * | 8/2010 | Ribbeck et al. | 407/22 |
| 2011/0164931 A1 * | 7/2011 | Ono | 407/22 |

\* cited by examiner

FACE HOBBING CUTTER SYSTEM AND INDEXABLE MILLING INSERTS FOR USE IN THE SAME

RELATED APPLICATION DATA

This application claims priority under 35 U.S.C. §119 to Chinese Patent Application No. 201210035560.1, filed on Feb. 16, 2012, which the entirety thereof is incorporated herein by reference.

TECHNICAL FIELD

In the first aspect, the present invention relates to a gear face hobbing cutter system and, in particular, to an adjustable, cartridged face hobbing cutter system for face hobbing spiral bevel gears on CNC Face Hobbing machines.

In the second aspect, the present invention further relates to indexable milling inserts for use in the spiral bevel gear face hobbing cutter system.

BACKGROUND ART

Bevel gears are widely used in trucks, construction vehicles and mining machinery. The current trend is that the potential is still in growing. At present, there are mainly two versions of bevel gears in the market. The first type is the bevel gears manufactured by Gleason, Germany (about 90% m/s), and the second type is the bevel gears manufactured by Klingelnberg, Germany (about 10% m/s). Thousands of tools for face hobbing Gleason version bevel gears exist in the market.

In typical processes of face hobbing bevel gears, the milling cutter and the workpiece rotate independently in a timing relationship with each other, thereby allowing continue indexing of the workpiece and continual formation of the gear teeth. Thus, in most of the face hobbing processes, a single plunge of the cutting tool can result in all the teeth of the gear being formed.

In the current industry, tool bits of high speed steel (HSS) are predominantly employed to face hob the spiral bevel gears. Alternatively, blades of high speed steel or solid carbide blades with various coatings are employed to face hob the spiral bevel gears. The blades can be re-sharpened and re-coated, which, however, consumes time and requires high cost. The existing cutting tools are also adjustable in radial and angular planes. Gleason version cutting tools have several styles in order to meet requirements on low and high volume production, and roughing to finishing machining.

Figure 1:
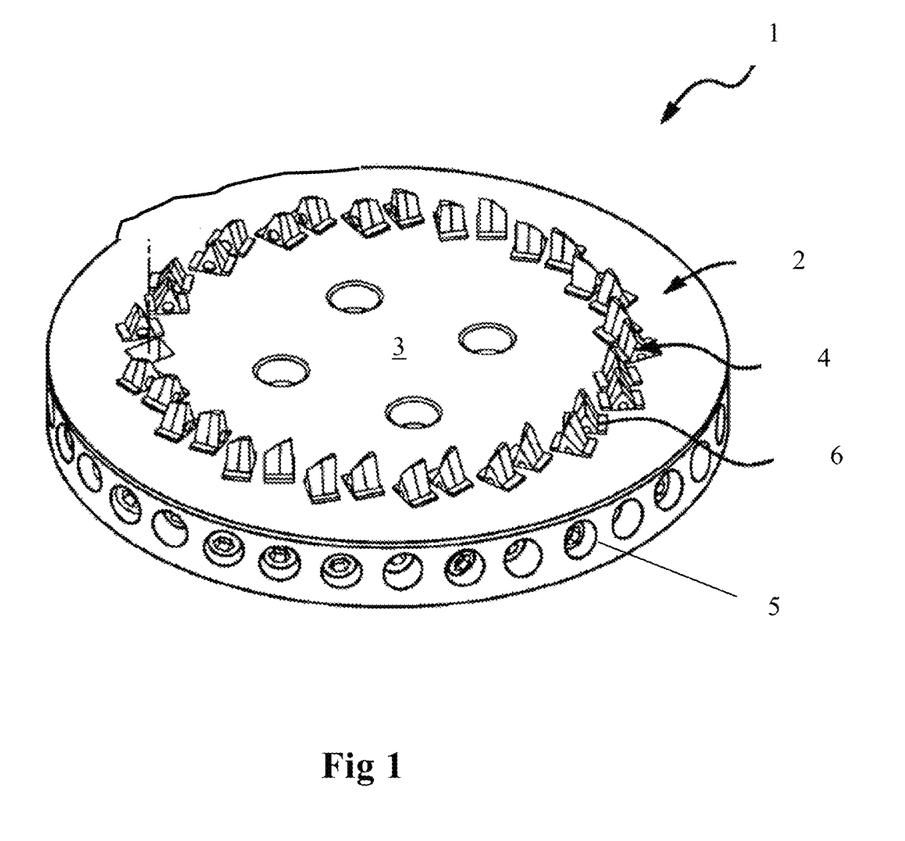
FIG. 1 is a perspective view of a cartridged, gear face hobbing cutter system according to the prior art.
Figure 2:
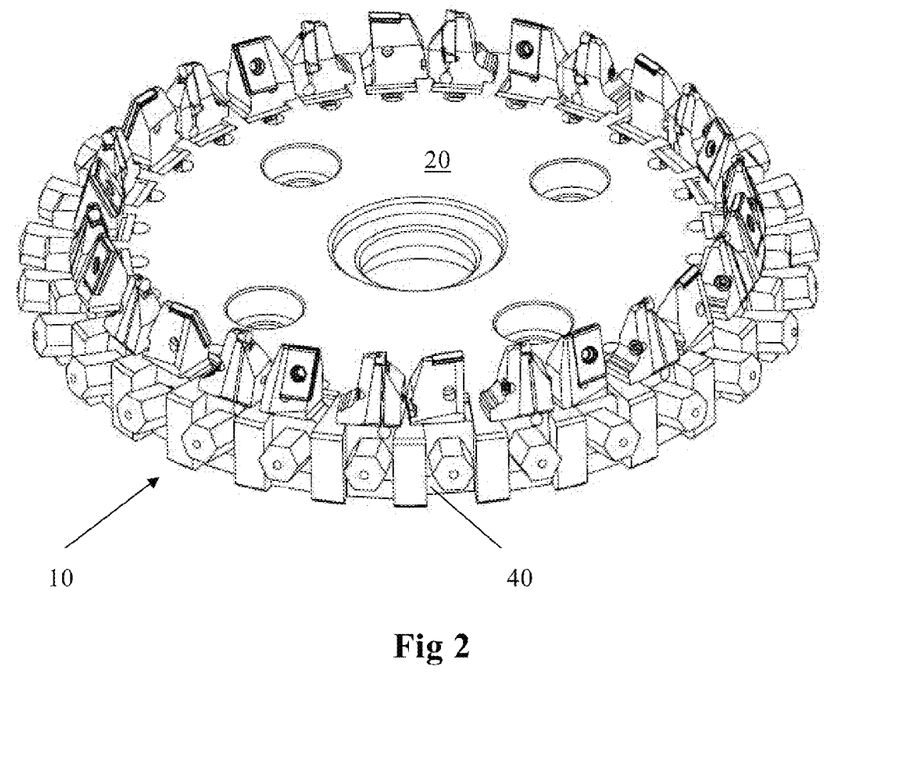
FIG. 2 is a perspective view showing a gear face hobbing cutter system according to an embodiment of the present invention.

U.S. Pat. No. 6,715,986 and U.S. Pat. No. 6,086,291 disclose a grooving insert, which can be used for milling tooth roots. German patent DE 20016673 discloses a milling cutter assembly, which can be used for milling tooth flanks, and in which inserts having rectangular basic shapes are employed. U.S. Pat. No. 6,632,050 B2 discloses a face hobbing cutter system, in which blades are employed. Chinese patent CN 00807087.3 discloses a face hobbing cutter system for face hobbing gears. U.S. Pat. No. 6,609,858 and U.S. Pat. No. 7,736,099 disclose cartridged, face hobbing cutter systems. For example, FIG. 1 shows an exploded perspective view of the face hobbing cutter system of U.S. Pat. No. 7,736,099, wherein the reference sign 1 denotes the gear milling cutter system, the reference sign 2 denotes the cutter disc, the reference sign 3 denotes the top surface of the cutter disc, the reference sign 4 denotes the cartridge assemblies, the reference sign 5 denotes the side surface of the cutter disc, and the reference sign 6 denotes the slots. In the face hobbing cutter system shown in FIG. 1, the cartridge assemblies 4 are arranged in two rows, i.e., an inside row and an outside row, for respectively milling the inner side and the outer side of the gear teeth, and the cartridge assemblies each include a cartridges and an indexable insert, all the cartridges and inserts being the same.

However, the disadvantages generally existing in current face hobbing cutter systems are as follows: due to the employment of the high speed steel tool bits or the solid carbide blades to machine the spiral bevel gears, the productivity is comparatively low, a wet machining is required (i.e., a cooling liquid is required), the set-up time is long, and the cost and time for replacing the tool bits or regrinding the blades is high. In the existing milling cutter system employing cartridge assemblies with indexable inserts, all the cartridges and inserts are the same, and the machining result is still not satisfactory. Accordingly, there exits a need for a bevel gear face hobbing cutter system achieving high productivity, dry cutting and less set-up time. In addition, it is expected to improve the life of the cutting tool.

SUMMARY OF THE INVENTION

The present invention aims at avoiding the above previously known disadvantages of the gear face hobbing cutters and provide a gear face hobbing cutter system, which is particularly suitable for machining spiral bevel gears and, in particular, for machining Gleason version spiral bevel gears with a module of 5-20. Accordingly, the main object of the present invention is to provide a gear face hobbing cutter system for roughing and semi-finishing operation of spiral bevel gears, in which different cartridges and indexable inserts are utilized to machine different parts of the spiral bevel gear teeth, instead of utilizing the HSS cutter bits and the solid carbide blades that are predominately used at present, or the cartridges and inserts that are the same and arranged in inside and outside rows so as to machine the inner sides and the outer sides of the gear teeth. The utilization of different cartridges and indexable inserts to machine the spiral bevel gears in the gear face hobbing system has the following advantages: higher metal removal rate, dry cutting, longer tool life, and less set-up time. Another object of the present invention is to provide tangential-mounted indexable milling inserts for use in the above gear face hobbing cutter system, the inserts being used for machining the tooth flanks of the gear teeth.

According to the first aspect of the present invention, a face hobbing cutter system for face hobbing spiral bevel gears is provided, which comprises, on one hand, a cutter disc rotatable about a central axis and having a rotationally symmetrical basic shape, the cutter disc including a top surface, a bottom surface and a side surface extending between the top surface and the bottom surface, and a plurality of pockets formed in the cutter disc for receiving cartridge assemblies and extending inwards from the top surface into the cutter disc, and which comprises, on the other hand, at least one set of detachable cartridge assemblies, each set of cartridge assemblies including a plurality of cartridge assemblies, the respective cartridge assemblies being spaced apart along a rotational direction, each cartridge assembly being fixed in place in its respective pocket by a clamping device, each cartridge assembly including cartridges and indexable milling inserts, and each milling insert being retained on its respective cartridge by a retaining device, characterized in that a part of the milling inserts in each set of cartridge assemblies are provided as tangential-mounted inserts for milling flanks of spiral bevel gear teeth, and the other inserts of the milling inserts in each set of cartridge assemblies are provide as grooving inserts, which are arranged transversely to the tangential-mounted inserts, for milling roots of the spiral bevel gear teeth, in that the tangential-mounted inserts of each set of cartridge assemblies are provided in pairs, one being provided with its front facing the central axis, and the other being provided with its front facing away the central axis, for respectively milling concave curved flanks and convex curved flanks of the spiral bevel gear teeth, and in that the tangential-mounted inserts each have a rhombic basic shape.

In an embodiment of the present invention, the grooving inserts and the tangential-mounted inserts are arranged in such a way that the grooving inserts have their respective most radially distanced point from the central axis at a larger radial distance than the respective most radially distanced point of the tangential-mounted inserts.

In an embodiment of the present invention, the milling inserts in each set of cartridge assemblies are alternately provided in the following order: a grooving insert, a first tangential-mounted insert, a grooving insert, a second tangential-mounted insert, wherein the second tangential-mounted insert is tangentially mounted in an opposite direction as the first tangential-mounted insert. Thus the cutter system is mounted with an equal number of grooving inserts and tangential-mounted inserts, wherein the tangential-mounted inserts are mounted in equal amount from two opposite directions. With this configuration, more cutting inserts are configured to cut the roots, and less cutting inserts are configured to cut each of the flanks.

Preferably, the respective cartridge assemblies are equidistantly spaced apart along the rotational direction.

Preferably, the face hobbing cutter system comprises 2-7 sets of cartridge assemblies, the respective sets of cartridge assemblies being evenly spaced apart along the rotational direction.

Preferably, each set of cartridge assemblies comprises 3-6 different cartridges to correspondingly hold the different milling inserts.

Preferably, the face hobbing system comprises 7 sets of cartridge assemblies, each set of cartridge assemblies including four cartridge assemblies, two of the milling inserts of the four cartridge assemblies being grooving inserts, and the other two of the milling inserts of the four cartridge assemblies being tangential-mounted insert, to form a complete gear tooth profile.

Preferably, the tangential-mounted insert has at least two cutting edges, preferably four cutting edges.

Preferably, the cartridge assembly further comprises a shim for providing an accurate radial setting of the cartridge assembly.

In the second aspect, the present invention further relates to the above indexable tangential-mounted inserts, which can be made of solid carbide and can be coated with coatings.

In the third aspect, the face hobbing cutter system according to the present invention can be used for roughing and semi-finishing operation of spiral bevel gears. Preferable machining parameters are as follows: a linear cutting velocity Vc of less than 350 m/min and a feed per tooth a of 0.25 mm at maximum.

According to the present invention, different inserts are utilized to machine different parts of the spiral bevel gear teeth, and the inserts for machining the flanks are particularly tangential-mounted and each have a rhombic basic shapes. High productivity, dry cutting and less set-up time when machining spiral bevel gears are achieved by the gear face hobbing cutter system of the present invention. Besides, the power load on meter when machining spiral bevel gears is low and the surface quality of the manufactured gear tooth is good. Another benefit with the designated inserts for the root and flanks is that it is possible to optimize the respective inserts. For example, using a more wear resistant grade insert for the flanks, and using a tougher grade insert for the root.

In addition, according to the present invention, thanks to the fact that the indexable tangential-mounted insert has at least two cutting edges, preferably fourth cutting edges, and is an insert having a rhombic basic shape, a positive axial inclination angle is achieved, which facilitates a better chip removal during machining, and the life of the cutting tool is long.

DETAILED DESCRIPTION

The face hobbing cutter system and the tangential-mounted inserts of the present invention will be described below according to FIGS. 2-7:

In the descriptions of the present invention, the term "tangential-mounted" is used by referring to the rotational machining direction of the face hobbing cutter system.

As shown in FIGS. 2-5, a face hobbing cutter system for face hobbing spiral bevel gears of the present invention comprises, on one hand, a cutter disc 10 rotating about a central axis C and having a rotationally symmetrical basic shape, the cutter disc 10 including a top surface 20, a bottom surface 30 and a side surface 40 extending between the top surface and the bottom surface, and a plurality of pockets 50 formed in the cutter disc for receiving cartridge assemblies and extending inwards from the top surface into the cutter disc, and comprises, on the other hand, 7 sets of detachable cartridge assemblies, the respective sets of cartridge assemblies being evenly spaced apart along a rotational direction, each set of cartridge assemblies including four cartridge assemblies 100, 200, 300, 400, the respective cartridge assemblies being equidistantly spaced apart along the rotational direction, each cartridge assembly being fixed in place in its respective pocket by a clamping device (not designated), each cartridge assembly including cartridges 110, 210, 310, 410 and indexable milling inserts 120, 220, 320, 420, and each milling insert being retained on its respective cartridge by a retaining device (not designated). Among the milling inserts of each set of cartridge assemblies, 2 inserts are provided as tangential-mounted inserts 220, 420 for milling flanks of spiral bevel gear teeth, and the other 2 inserts are provide as grooving inserts 120, 320, which are arranged transversely to the tangential-mounted inserts, for milling roots of the spiral bevel gear teeth. One (220 in this embodiment) of the tangential-mounted inserts 220, 420 of each set of cartridge assemblies is provided with its front facing the central axis, and the other (420 in this embodiment) thereof is provided with its front facing away the central axis, for respectively milling concave curved flanks and convex curved flanks of the spiral bevel gear teeth.

Figure 3:
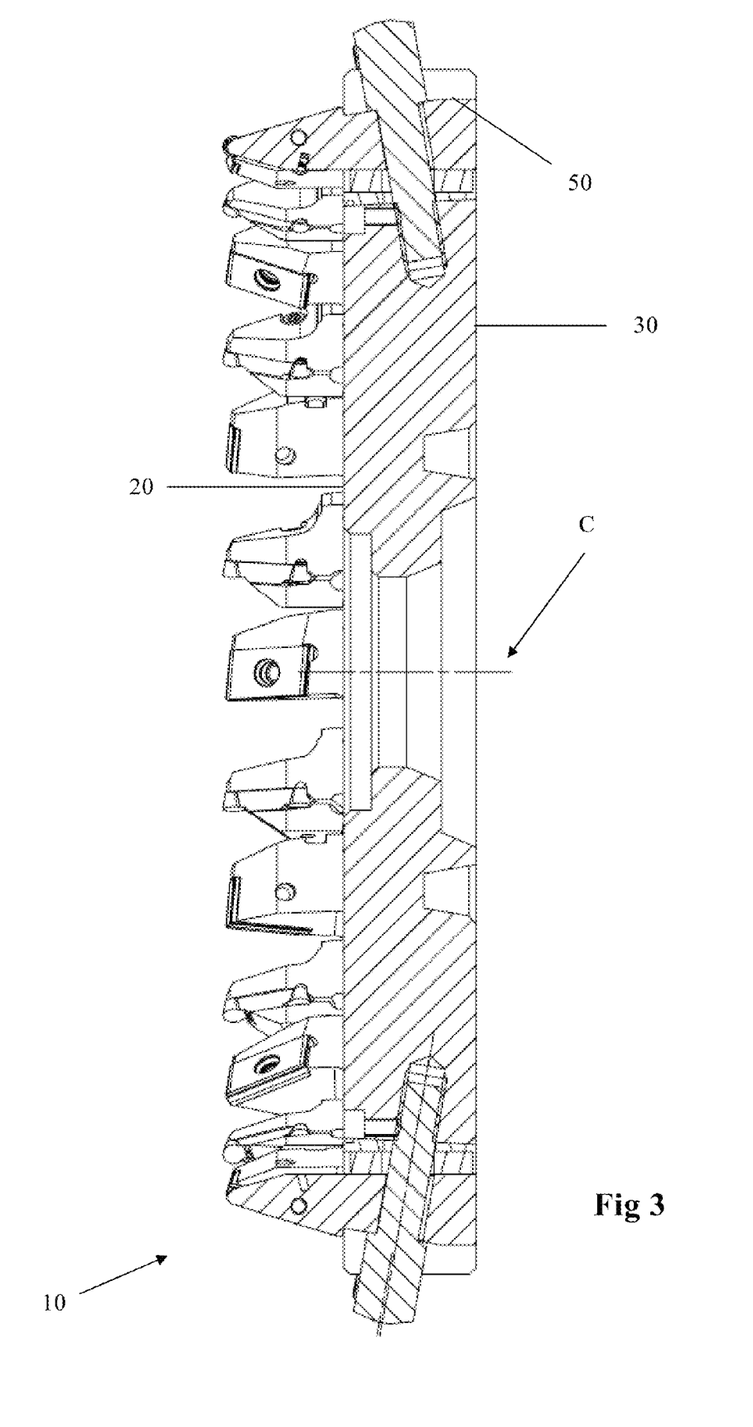
FIG. 3 is a cross-sectional view of a gear face hobbing cutter system of an embodiment of the present invention.

As shown in FIG. 3, the grooving inserts 120 and 320 each have their respective most distanced point from the top surface 20 of the disc at a larger distance from the top surface 20 than the corresponding distance for the tangential-mounted inserts 220 and 420.

Figure 4:
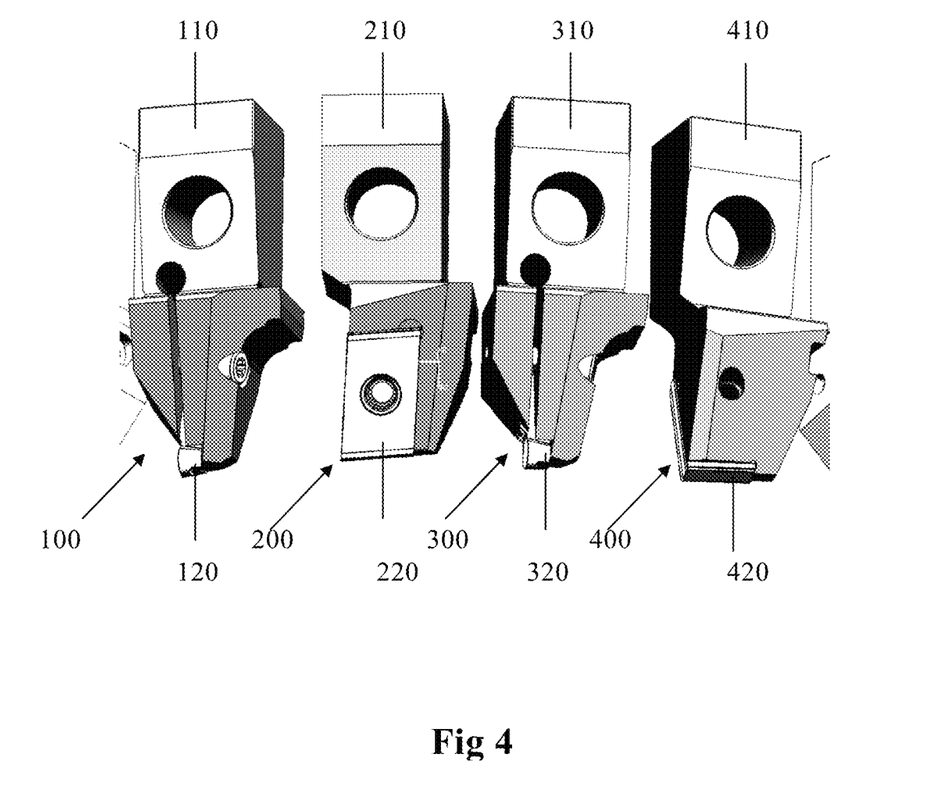
FIG. 4 is an enlarged perspective view of one set of cartridge assemblies of an embodiment of the present invention.
Figure 5A:
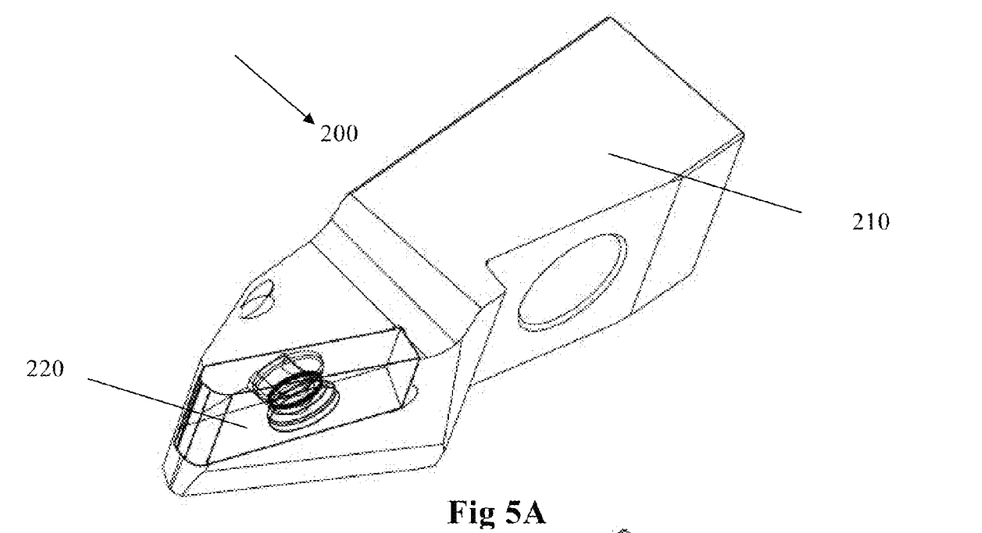
FIGS. 5A-C are respectively perspective views of the cartridge assemblies with the grooving inserts and the tangential-mounted inserts according to FIG. 4.
Figure 5B:
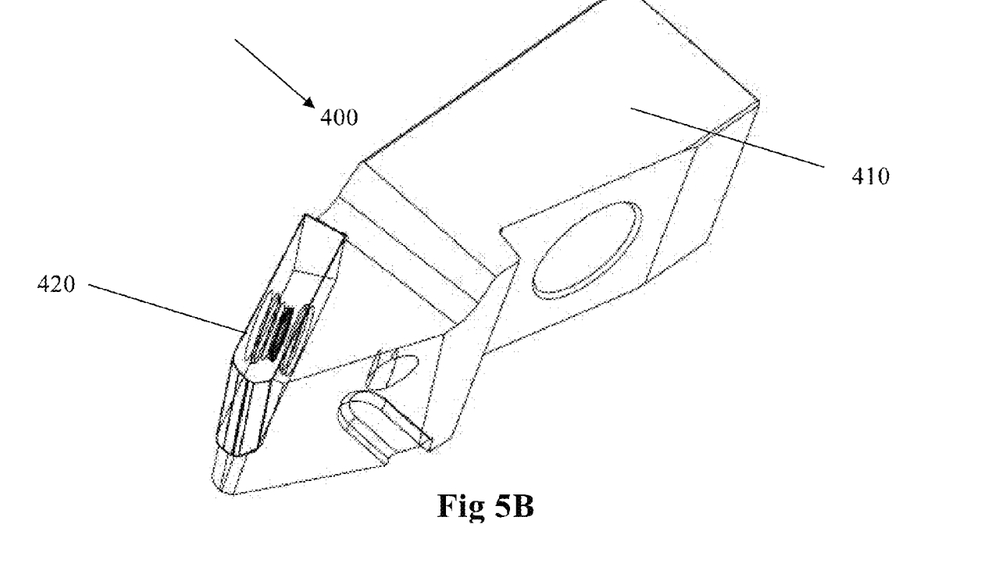
Figure 5C:
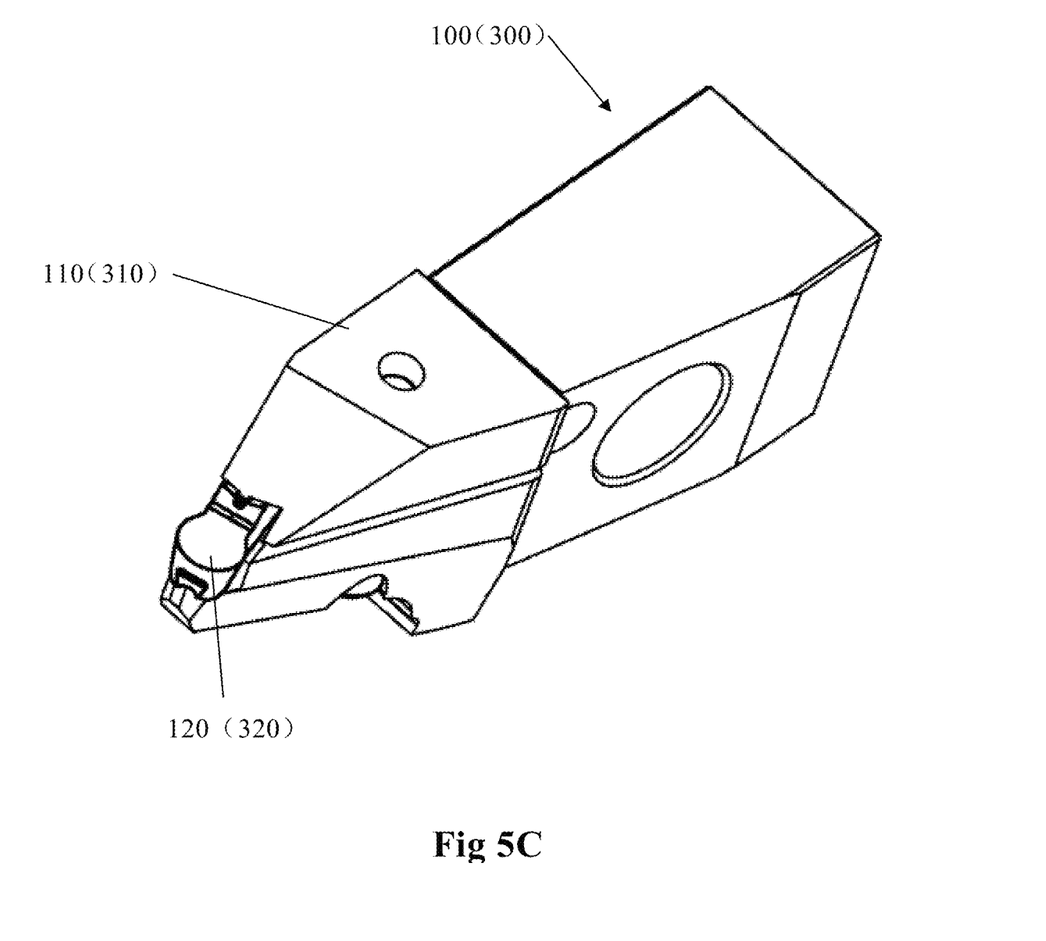

As best seen in FIG. 4, four milling inserts in each set of cartridge assemblies are alternately provided in the following order: grooving insert 120, tangential-mounted insert 220, grooving insert 320 and tangential-mounted insert 420, wherein the tangential-mounted insert 420 is tangentially mounted in an opposite direction as the tangential-mounted insert 220. In other words, each set of cartridge assemblies is mounted with an equal number of grooving inserts and tangential-mounted inserts, wherein the tangential-mounted inserts 220 and 420 are mounted in equal amount from two opposite directions. With this configuration, more cutting inserts are configured to cut the roots, and less cutting inserts are configured to cut each of the flanks.

The cartridge assembly can further comprise a shim 60 for providing an accurate radial setting of the cartridge assembly.

Figure 6:
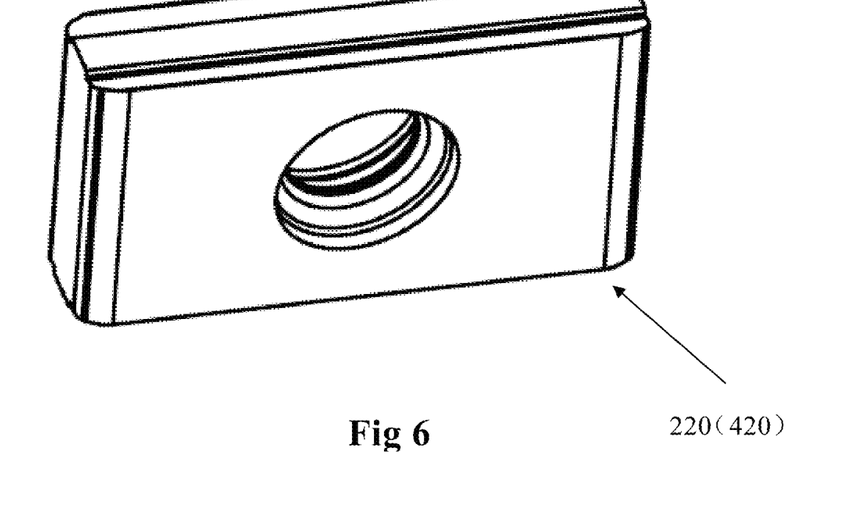
FIG. 6 is a perspective view of the tangential-mounted insert according to the present invention.
Figure 6A:
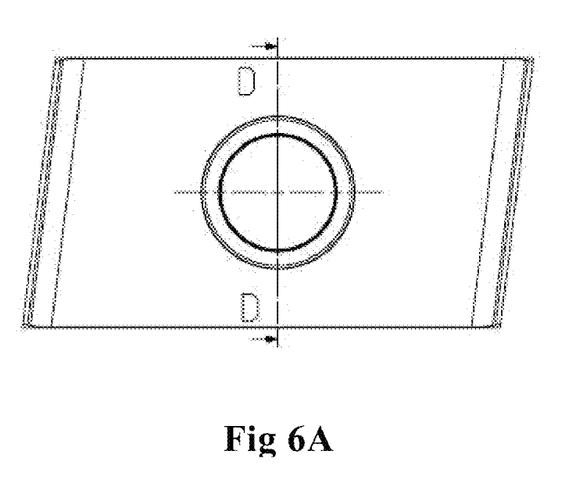
FIGS. 6A-6B are a plan view and a cross-sectional view of the tangential-mounted insert according to FIG. 6, respectively.
Figure 6B:
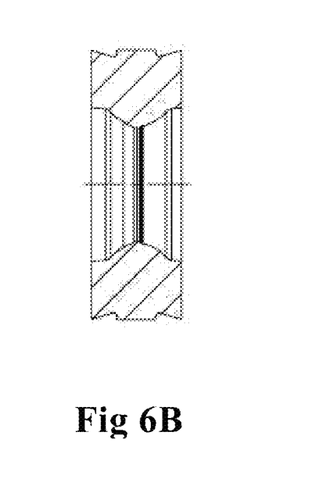

The indexable tangential-mounted inserts of the present invention are described below according to FIGS. 6, 6A and 6B. As shown in the figures, the tangential-mounted inserts 220, 420 each have a rhombic basic shape and have four cutting edges.

The face hobbing cutter system of the present invention is particularly suitable for roughing and semi-finishing operation of spiral bevel gears. Proper machining parameters are as follows: a linear cutting velocity Vc of less than 350 m/min, and a feed per tooth fz of 0.25 mm at maximum.

EXAMPLE 1

A 28 cutter pocket 12" (about 30 cm) cutter disc, on which 28 cartridge assemblies were mounted (the cartridges are obtained from Sandvik Coromant, Sweden), manufactured by Harbin No. 1 Tool Works was used. The cartridge assemblies were divided into seven sets in total, each set including 4 cartridge assemblies, two of the milling inserts of the 4 cartridge assemblies being provided as tangential-mounted inserts for machining the flanks of the spiral bevel gear teeth, and the other two of the milling inserts being provided as grooving inserts (CoroCut inserts of Sandvik Coromant, Sweden) for machining the roots of the gear teeth. The grooving inserts were provided transversely to the tangential-mounted inserts. One of the two tangential-mounted inserts was provided with its front facing the central axis, and the other thereof was provided with its front facing away the central axis, for respectively milling concave curved flanks and convex curved flanks of the gear teeth. The tangential-mounted inserts each had a rhombic basic shape.

In addition, the cartridge assembly further comprises a soft shim. The cartridges were adjusted to 5 microns run out radially and the height variance was 30 microns.

The assembled face hobbing cutter system was mounted on the JCB60 type CNC machine to machine a Gleason version spiral bevel gear. The material of the workpiece was low alloy steel. The hardness of the workpiece was 150 HB.

EXAMPLE 2

The following parameters were employed to perform the machining: 157 RPM, 150 m/min, fzc=0.56 mm/tooth, fzf=0.112 mm/tooth, hex (flank)=0.037 mm. The machining condition was dry milling.

As a result, the cutting time for each tooth was 10 seconds. The machining speed was too slow. Besides, chip welding occurred in the milled gear, and the grooving inserts for machining the roots were chipped.

EXAMPLE 3

The following parameters were employed to perform the machining: 230 RPM, 220 m/min, fzc=0.08 mm/tooth, fzf=0.16 mm/tooth, hex (flank)=0.053 mm. The machining condition was dry milling.

As a result, the cutting time for each tooth was 5 seconds. The machining speed was acceptable. Besides, the quality of the milled gear is acceptable. The power load on meter is 26%.

EXAMPLE 4

The following parameters were employed to perform the machining: 230 RPM, 220 m/min, fzc=0.114 min/tooth, fzf=0.23 mm/tooth, hex (flank)=0.076 mm. The cutting tool dwelled in roots for 0.15-0.3 second after machining the roots. The machining condition was dry milling.

As a result, the cutting time for each tooth was 3.5 seconds. The machining speed was very fast. Besides, vibration patterns occurred in the surfaces of the roots during machining were small, and the quality of the milled gear was excellent. The power load on meter was 38%.

The above examples indicate that the utilization of the face hobbing cutter system according to the present invention to machine the spiral bevel gears achieves a fast machining speed, an improved productivity and a good surface finish (a measurement of a Class 6 gear rating on profile tolerance) of the milled gears. Besides, the machining condition is dry cutting, which requires no cooling liquid. The wear of the cutting tool is small, and the life of the cutting tool is improved. Furthermore, the cutting is smooth, and the vibration patterns occurred in the roots during machining are small. In addition, according to the present invention, the cartridge assembly further has a soft shim, thereby providing an accurate radial adjustment in order to be adapted for gears of different sizes.

Those skilled in the art can understand that the above descriptions are merely illustrative. Those skilled in the art can still make various modifications and variants to the present invention without departing from the idea and scope of the present invention.

The invention claimed is:

1. A face hobbing cutter system for face hobbing spiral bevel gears, comprising:
    a cutter disc rotatable about a central axis and having a rotationally symmetrical basic shape, the cutter disc including a top surface, a bottom surface and a side surface extending between the top surface and the bottom surface;
    a plurality of pockets formed in the cutter disc for receiving a plurality of cartridge assemblies and extending inwards from the top surface into the cutter disc; and at least one set of detachable cartridge assemblies, each set of cartridge assemblies including a plurality of cartridge assemblies, each of the respective cartridge assemblies being spaced apart along a rotational direction, each of the cartridge assemblies being fixed in place in a respective pocket of the cutter disc by a clamping device, each of the cartridge assemblies including a plurality of cartridges and a plurality of indexable milling inserts, each of the plurality of indexable milling inserts being retained on its respective cartridge by a retaining device, wherein some of the plurality of indexable milling inserts in each set of cartridge assemblies are tangential-mounted inserts for milling flanks of spiral bevel gear teeth, while the other inserts of the plurality of milling inserts in each set of cartridge assemblies are grooving inserts, the tangential-mounted inserts each having at least two cutting edges, the grooving inserts being arranged transversely to the tangential-mounted inserts for milling roots of the spiral bevel gear teeth, the grooving inserts and the tangential-mounted inserts being arranged so that the grooving inserts have a respective most distanced point from the top surface of the disc at a larger distance than a corresponding distance of the tangential-mounted inserts, said tangential-mounted inserts of each set of cartridge assemblies being provided in pairs, one tangential-mounted insert of the pair being provided with its front facing the central axis, and the other being provided with its front facing away the central axis, so as to form respectively milling concave curved flanks and convex curved flanks of the spiral bevel gear teeth, the tangential-mounted inserts being arranged to only cut the flanks and the grooving inserts being arranged to only cut the roots of the spiral gear teeth, wherein the plurality of indexable milling inserts in each set of cartridge assemblies are alternately provided in the following order: a grooving insert, a first tangential-mounted insert, a grooving insert, a second tangential-mounted insert, and wherein the second tangential-mounted insert is tangentially mounted in an opposite direction as the first tangential-mounted insert.

2. The face hobbing cutter system according to claim 1, wherein the respective cartridge assemblies are equidistantly spaced apart along the rotational direction.

3. The face hobbing cutter system according to claim 1, comprising 2-7 sets of cartridge assemblies, the respective sets of cartridge assemblies being evenly spaced apart along the rotational direction.

4. The face hobbing cutter system according to claim 1, wherein each set of cartridge assemblies comprises 3-6 different cartridges to correspondingly hold the different milling inserts.

5. The face hobbing cutter system according to claim 1, comprising seven sets of cartridge assemblies, each set of cartridge assemblies including four cartridge assemblies, two of the milling inserts of the four cartridge assemblies being grooving inserts, and the other two of the milling inserts of the four cartridge assemblies being tangential-mounted inserts.

6. The face hobbing cutter system according to claim 1, wherein the tangential-mounted inserts each have four cutting edges.

7. The face hobbing milling cutter system according to claim 1, wherein the indexable tangential-mounted inserts each have four cutting edges.

8. The face hobbing milling cutter system according to claim 1, wherein the cutter disc is provided for a roughing and semi-finishing operation of spiral bevel gears.

9. The face hobbing milling cutter system according to claim 8, wherein the roughing and semi-finishing operation has machining parameters as follows: a linear cutting velocity of less than 350 m/min, and a maximum feed per tooth of 0.25 mm.

* * * * *